United States Patent [19]
Inoue et al.

[11] Patent Number: 5,761,384
[45] Date of Patent: Jun. 2, 1998

[54] FUZZY NEURAL NETWORK SYSTEM

[75] Inventors: Tsuyoshi Inoue; Teruhiko Matsuoka, both of Chiba; Takashi Aramaki, Ichihara, all of Japan

[73] Assignee: Sharp Kabushiki Kaisha, Osaka, Japan

[21] Appl. No.: 451,977

[22] Filed: May 26, 1995

[30] Foreign Application Priority Data

Jul. 27, 1994 [JP] Japan .................. 6-175805

[51] Int. Cl.$^6$ .................. G06F 15/18
[52] U.S. Cl. .................. 395/22; 395/24; 395/3
[58] Field of Search .................. 39/22–24, 61, 39/51, 20, 21, 50, 3

[56] References Cited

U.S. PATENT DOCUMENTS

| | | | |
|---|---|---|---|
| 5,416,888 | 5/1995 | Shimokawa | 395/22 |
| 5,487,130 | 1/1996 | Ichimori et al. | 395/3 |
| 5,524,176 | 6/1996 | Narita et al. | 395/22 |

FOREIGN PATENT DOCUMENTS

Hei 5-224939  9/1993  Japan .................. G06F 9/14

OTHER PUBLICATIONS

Cohen et al., "Neural Network Driven Fuzzy Inference System," Neural Networks, 1994 Intern. Conf. vol. 3, pp. 1532–1536, Dec. 30, 1994.

Nomura et al., "A Learning Method of Fuzzy Inference Rules by Descent Method," Fuzzy Systems, Int'l. Conf. 1992, pp. 203–210, Dec. 30, 1992.

Horikawa et al., "On Identification of Structures in Premises of a Fuzzy Model Using a Fuzzy Neural Network," Fuzzy Systems, Int'l Conf. 1993, pp. 661–666, Dec. 30, 1993.

Kawamura et al, "Neurofuzzy System, An Overview and a Prototype Syustem", pp. 180–187.

Okada et al, "Initializing Multilayer Neural Networks with Fuzzy Logic", Proceedings of the 1992 International Joint Conference on Neural Networks(UCNN), Baltimore, MD, Jun. 7–11, 1992, vol. 1, pp. 239–244.

Horikawa et al, "On Fuzzy Modeling Using Fuzzy Neural Networks With the Back–Propagation Algorithm", IEEE Transactions on Neural Networks, vol. 3, No. 5, Sep. 1992, pp. 801–806.

Primary Examiner—Tariq R. Hafiz
Attorney, Agent, or Firm—Nixon & Vanderhye, P.C.

[57] ABSTRACT

A fuzzy neural network system which is provided with an input layer, a membership layer front half section, a membership layer back half section, a rule layer, and an output layer; and constructs a network from a plurality of input/output items. The input layer and the membership layers are structured so as to divide each input value into three regions of fuzzy sets, respectively. The rule layer selects one each respectively from the above mentioned items divided into three regions, and is structured so as to make these the AND rules for the two input items.

4 Claims, 10 Drawing Sheets

Membership function showing Big

Membership function showing Middle

Membership function showing Small

The change in the output is large even with a small shift

The change in the output is small with a small shift

FUZZY NEURAL NETWORK SYSTEM

BACKGROUND OF THE INVENTION (1). Field of the Invention

The present invention relates to a fuzzy neural network system which uses a fuzzy structure in the neural network.

(2). Description of the Prior Art

Figure 1:
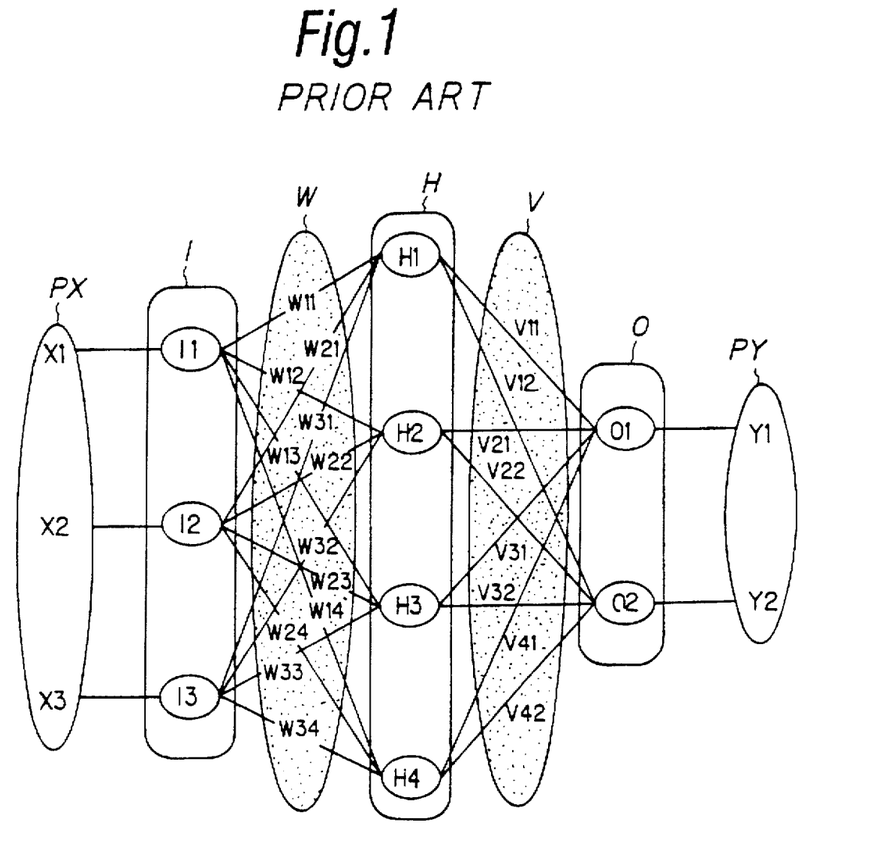
FIG. 1 is a structure view which shows one example of a conventional neural network.

Conventional neural network systems use a hierarchical neural network made up of, for example, as shown in FIG. 1, the three layers of an input layer I, a hidden layer H, and an output layer O, conventional systems perform the regulation of a weight W of the interconnection between the input layer I and the hidden layer H, and of a weight V of the interconnection between the hidden layer H and the output layer O, so that the input/output relationship of the sample data represented by the input pattern PX of the item which is made the candidate, and the output pattern PY which corresponds to that. As a system which conducts this type of process, among representative systems, there is the processing system referred to as the back propagation method.

Figure 2A:
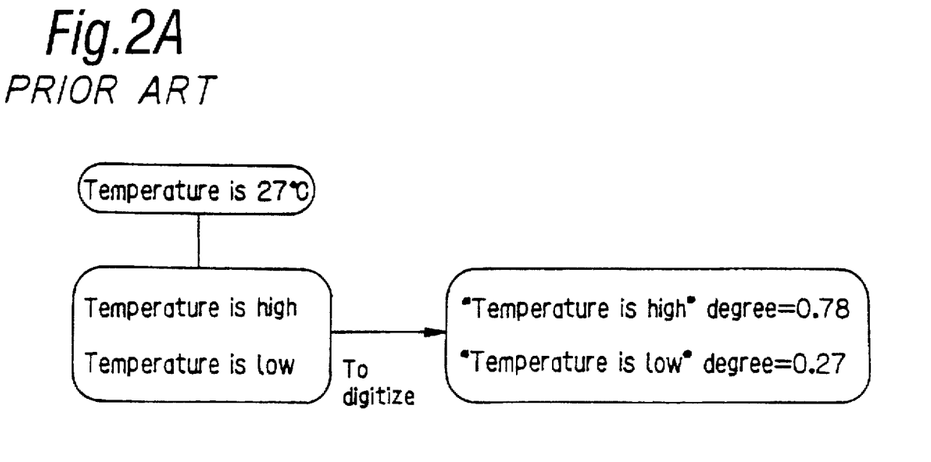
FIG. 2A is a digitized explanatory view of a vague expression of a human for the purpose of summarily explaining the fuzzy theory.
Figure 2B:
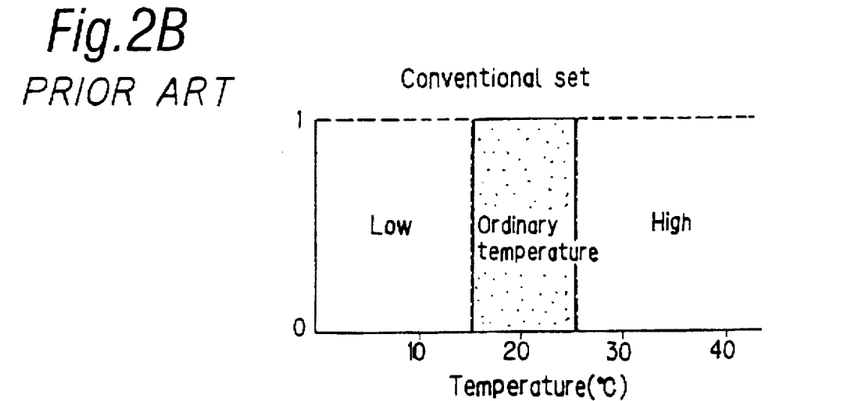
FIG. 2B is an explanatory view of an expression in a conventional set theory for the purpose of summarily explaining the fuzzy theory.
Figure 2C:
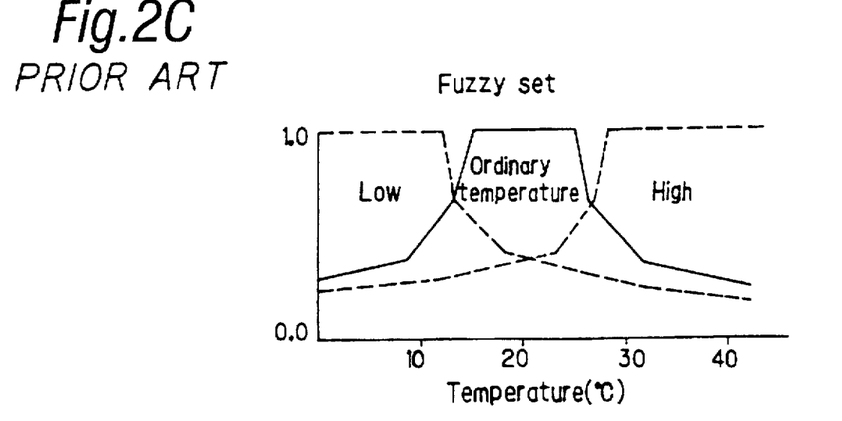
FIG. 2C is an explanatory view of an expression according to a fuzzy set theory in which a membership function has been introduced for the purpose of summarily explaining the fuzzy theory.

On the other hand, as one example of fuzzy logic, there is that which is further explained in FIG. 2A to FIG. 2C. For example, when there was an input of "the temperature is 27 degrees centigrade", and when a vague human expression such as "temperature is high," and "temperature is low" (FIG. 2A), was represented, in the conventional set only the 2 values of "0" and "1" could be expressed (FIG. 2B), so as to say that above a certain threshold value the temperature is high and below another threshold the temperature is low. However, using as a mathematical base the fuzzy set theory in which the membership function has been introduced, it is made so as to digitize the vagueness by representing the degree that "the temperature is high" (for example 0.78), and the degree that "the temperature is low" (for example 0.27), in real numbers from "0" to "1" (FIG. 2C).

That which is referred to as fuzzy control is conducted by using this logic. This, for example, displays expert knowledge as a fuzzy rule, and conducts control by means of an output value that is obtained from various input patterns by means of calculations based on the fuzzy logic.

Recently, a neuro fuzzy fusion system in which this is used has been proposed (for example, Japanese Patent Application Laid-Open Hei 5 No. 224939). This extracts the knowledge which is obtained from the intuition and experience of experts, with a system of membership function and fuzzy rules, makes a fuzzy model, determines the interconnections between the units which comprise the network and the weight of those interconnections based on that model, forms a neural network, and for example, becomes a structure like that shown in FIG. 3.

Figure 3:
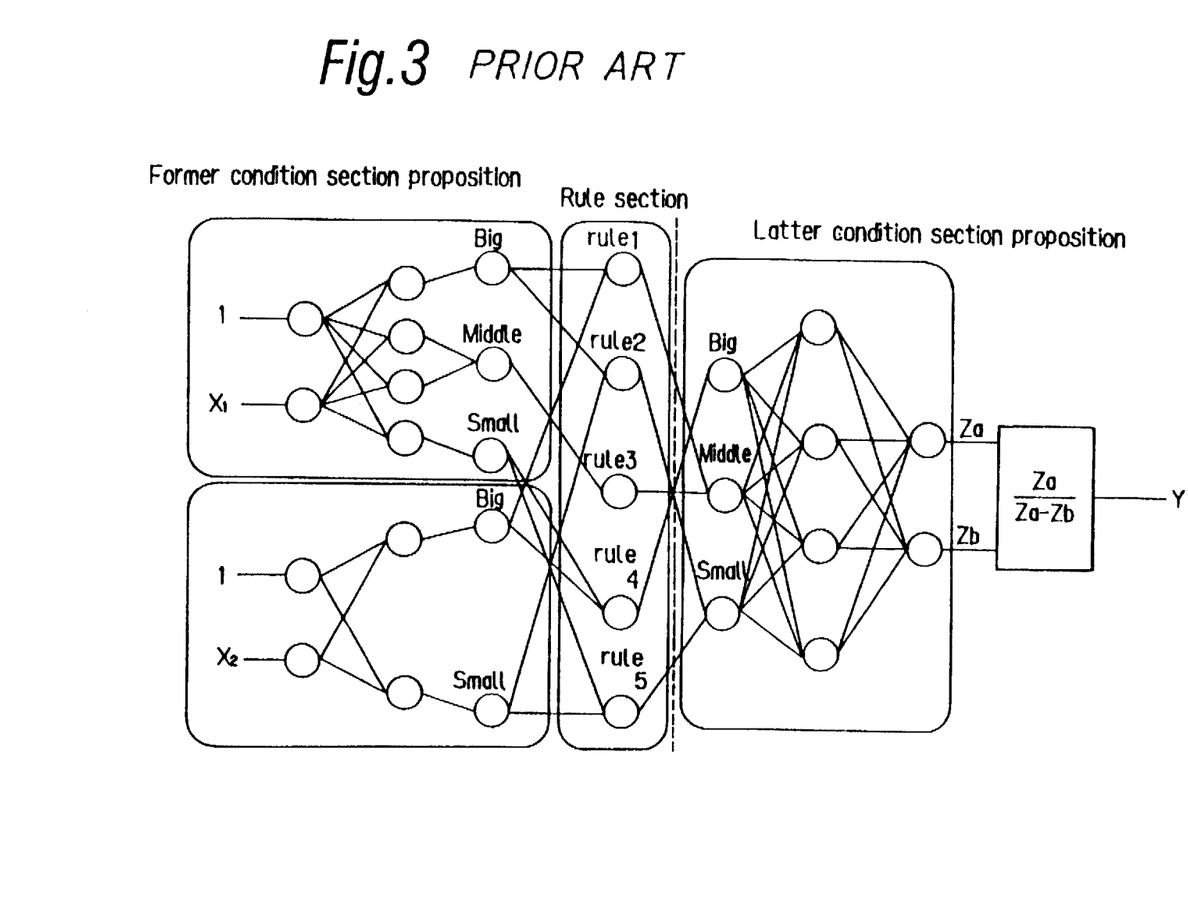
FIG. 3 is a structure view of a conventional neuro fuzzy fusion system.

In FIG. 3, a fuzzy set which uses the fuzzy rule for respective inputs is realized in a network. In this example, in the former condition section proposition, an input value x 1 shows three fuzzy interconnections of big, middle, and small, and an input value×2 shows 2 fuzzy interconnections of big and small. In the rule section, the unit of the number of the fuzzy rules is used, and the output of the former condition section proposition of the fuzzy rule is coupled following the fuzzy rule. In this example, as rule 1, "x 1 is big and x 2 is big" and such, and 5 rules are structured in all sections. The output value is calculated by using the latter condition section membership function from the output value of the rule according to the latter condition section proposition.

In the conventional neuro fuzzy fusion system, since a network is constructed according to the knowledge obtained form the expert intuition and experience, in the event that was too vague or in the event it was mistaken, the network became a structure which was different from the structure actually desired, and not only did the training of the network take a lot of time, there were also unfavorable circumstances in which proficient learning could not be accomplished.

In the event that either the sample data for learning was scanty or localized, or the sampled data was data that was not in the fuzzy rule that was structured, there was the unfavorable circumstance that the learning could not be done well.

SUMMARY OF THE INVENTION

An object of the present invention is to provide a fuzzy neural network system such that correct learning can be done even when there is this type of knowledge that is too vague, or sample data is included which is not within the fuzzy rule that was obtained from that, and also, to define a value input/output relationship from the structure of that network.

The fuzzy neural network system according to the present invention is equipped with an input layer, a membership layer front half section, a membership layer back half section, a rule layer, and an output layer, and constructs a network from the number of input/output items.

In this case, the input layer and the membership layer are structured so as to be divided into three regions so that each input value is divided among the three regions of the respective fuzzy sets, the rule layer selects them one each respectively from the items which have been divided in the three regions, and these are structured as an AND rule for 2 input items.

In this case, all of the weights are in the interconnections between each layer, and as weights which are adjusted by the training of the network, there is the weight of the interconnection between the input layer and the membership layer front half section, the weight of the interconnection between the membership layer front half section and the membership layer back half section, and the weight of the interconnection between the rule layer and the output layer. The weights of the other interconnections are all structured so as to be fixed values.

Further in this case, the weight of the interconnection between the input layer and the membership layer front half section is the center value of the membership function, the weight of the interconnection between the membership layer front half section and the membership layer back half section is the slope of the membership function, and the weight of the interconnection between the rule layer and the output layer is the significance of each rule.

This invention, along with structuring a fuzzy model by extracting the input/output relationship in the form of a rule having a former condition section proposition and a latter condition section proposition having fuzzy sets, and a membership function that is defined in order to quantify there, also constructs a network from just the number of input/ output items that is separated from this fuzzy model, and provides a fuzzy neural network that is built by basing the weight of the interconnections on the fuzzy model.

Therefore, based on the structure of the present invention, structuring network just from the number of input/output items is possible. When structuring the network, since each of the input values are structured so as to be divided into the three regions of Big, Middle, and Small, each of the input value must be classified in at least one regions of these three regions. By this means, even when sample data which has been obtained from expert knowledge and which does not seem to be in the fuzzy rule is entered, since it must fit in and AND rule somewhere in the above network, it is possible to express the significance of the rule for that sample data as a weight form the rule layer to the output layer by means of training the network. Therefore, not only it is possible to avoid that the training maybe conducted in a mistaken direction based on that sample data, but also a large error which might be caused can be avoided. Hence, a fuzzy rule can be obtained from the sampled data.

By means of training of the network, in order for the contribution rate of each input item to be represented as a weight which expresses the slope of the membership function, it can be seen from those weights which input item has a value which deviates and which output value is easily changed. Furthermore, by means of training the network, because the correct region of teach input item is expressed as a weight which shows the center value of the membership function, it can be seen from that weight which range deviates when the value of each item deviates and which output value is easily changed.

In regard to a plurality of entered items, two items are selected from all of the entered items, one region at a time is selected from among the three regions into which the respective input values are divided, and by means of finding their logical products, AND rules for the two input items are structured, and even if too vague of a rule or a mistaken rule is considered, the unit of an AND rule somewhere must be in agreement.

When adjusting the weight according to the training of the network, the weight which realizes the membership function is made so as to correct only the weight which has been selected according to the calculations of the AND rule. Because it becomes a structure such that the weight of the membership function which constructs the Middle corrects only the weight which participates in the output of the Middle membership, and since the weight which must be trained is selected, the amount of calculations is reduced.

DESCRIPTION OF THE PREFERRED EMBODIMENT

Figure 4:
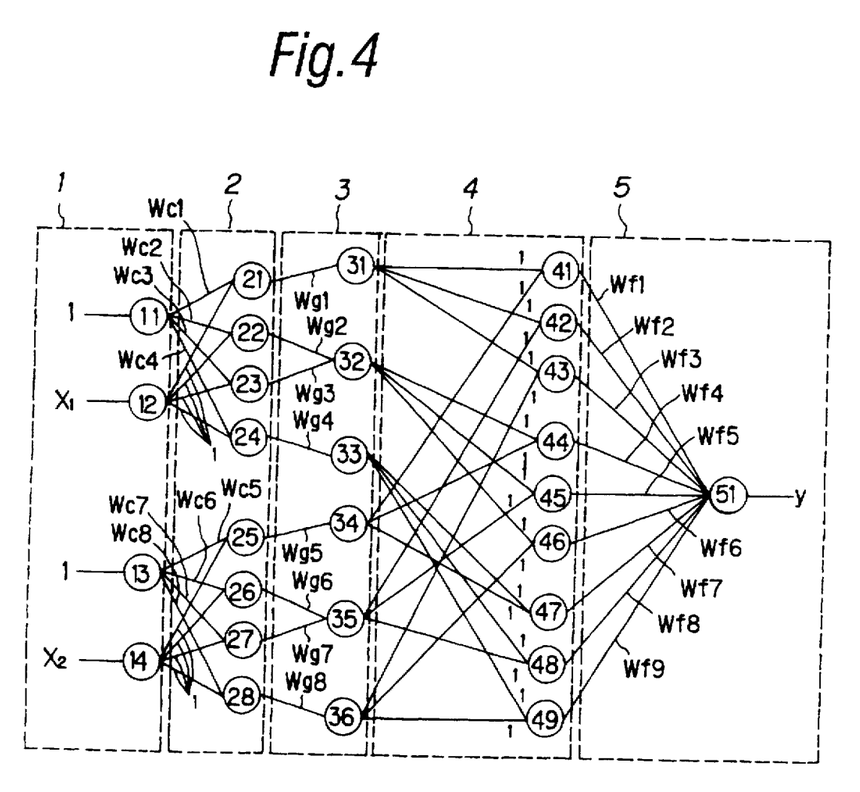
FIG. 4 is a structural view showing an embodiment of the present invention.

FIG. 4 is a structural diagram showing an embodiment of the fuzzy neural network system based on the present invention. This system is a fuzzy neural network with two inputs and one output which is structured in relation to a candidate in which one output item is obtained from two input. This system comprises five layers: of an input layer 1, a membership layer front half section 2, a membership layer back half section 3, a rule layer 4, and an output layer 5. This system constructs a membership layer by combining the second layer and the third layer.

The interconnections between unit to unit of each layer are structured as following. First, the input layer 1 is structured of two units 11, 12 and units 13, 14 for each input item, a fixed number 1 is entered to the units 11, 13 respectively, an input value X1 is entered to the unit 12, and an input value X2 is entered to the unit 14.

Figure 5:
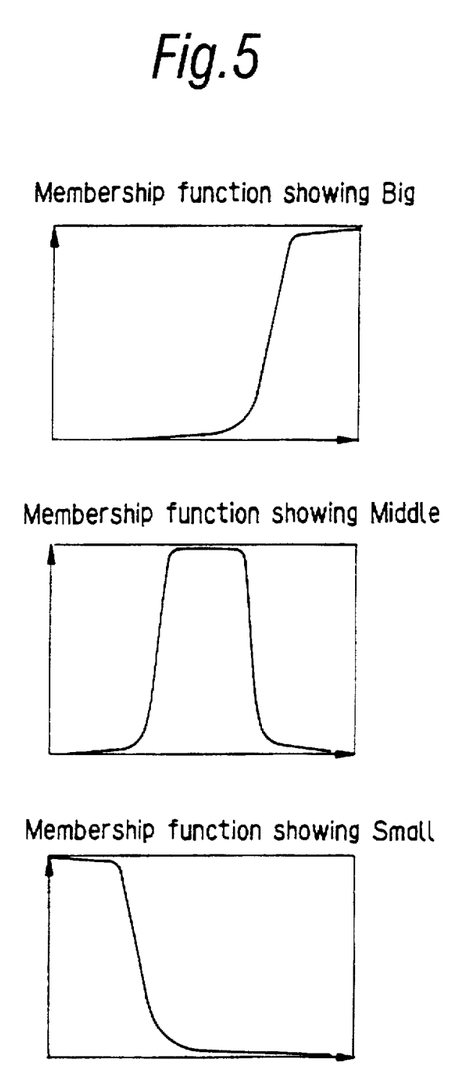
FIG. 5 is a view showing the membership functions (Big, Middle, Small)

Membership layers 2 and 3 are connected, as is shown in FIG. 5, so as to construct membership functions of Big, Middle, and Small, for each input item. First, each of the 4 units 21 to 24 and 25 to 28 are structured in the front half section 2, the fixed member 1 and the input value X1 are connected at the units 21 to 24, and the fixed number 1 and the input value X2 are connected at the units 25 to 28.

In the back half section 3 each of the three units 31 to 33, and 34 to 36 are structured, and connect to one of two units of the front half section 2. The section connected one unit are units 31 and 34, and become the section which constructs Big, and unit 33 and 36 become the section which constructs Small. The section connected to two units are 32 and 35, and become the section which constructs Middle. These are units which must be structured for each single input item, and the number of units for each input item is fixed (front half section 4, back half section 3).

Next is a rule layer 4, and comprises units 41 to 43 so as to be a logical product for each of the respective units 34 to 36 of the input value X2 side in relation to the unit 31 of the input value X1 side. In the same manner, rule layer 4 comprises units 44 to 46 so as to take the logical products for the units 34 to 36 respectively of the input value X2 side in relation to the unit 32 of the input value X1 side, and constructs units 47 to 49 so as to be a logical product for the units 34 to 36 of the input value X2 side in relation to the unit 33 of the input value X1 side. It is structured so that if there were an input value X3, there would also be a logical product for those Big, Middle, and Small.

Lastly, in the output layer 5, the number of the units is determined in response to the number of the output items, and outputs from the rule layer 4 for each unit are all connected at unit 51, and is structured so an to output as output value y.

Figure 6A:
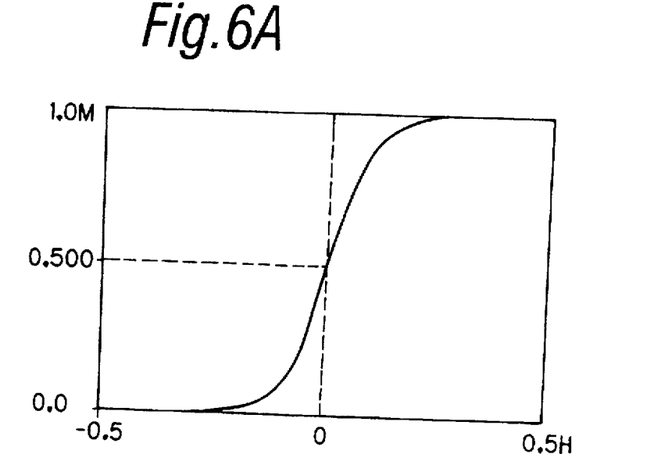
FIG. 6A and FIG. 6B are views showing a forming method for a membership function according to the sigmoid function.
Figure 6B:
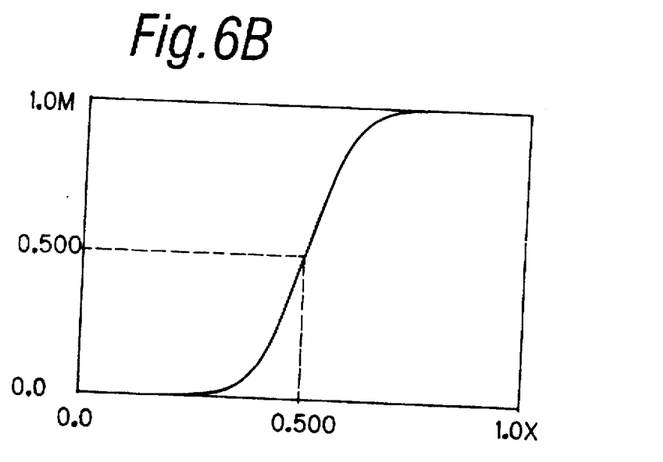

In this interconnection sections between the units of a network that is structured in this manner, there is a weight at each and every one of those interconnections. First, in the connecting section between the input layer 1 and the membership layer front half section 2, the center value (the input value when the output value of the membership function becomes 0.5) of the membership function shown in FIG. 6 becomes weight Wc1 to Wc8.

In other words, as for the membership function, there are three types as was previously mentioned, but the center value of the respective membership function match each weight. For example, the weight of the center value of the membership function which expresses Big of the input value X1 is Wc1, the weights of the center values of the membership function which expresses Middle are Wc2 and Wc3, and the weight of the center value of the membership function which expresses Small is Wc4. As for Middle, as shown in FIG. 7, since it has become the form of logical products of 2 membership functions, it has 2 center values.

Next, in the interconnection sections between front half section 2 and the back half section 3 of the membership layer, the slope of the membership function shown in FIG. 6A and FIG. 6B becomes weights Wg1 to Wg8. As for these also, in the same manner as the center value, the slope of each respective membership function matches each weight. For example, the weight of the slope of the membership function which expresses Big of input value X1 is Wg1, the weight of the slopes of the membership functions which express Middle are Wg2 and Wg3, and the weight of the slope of the membership function which expresses small is Wg4. In this case also, since the Middle becomes a form of logical products of 2 membership functions, it comes to have 2 slopes.

Lastly, at the interconnection section of the rule layer 4 and the output layer 5, the knowledge that has been obtained from an expert becomes weights Wf1 to Wf9.

Figure 7:
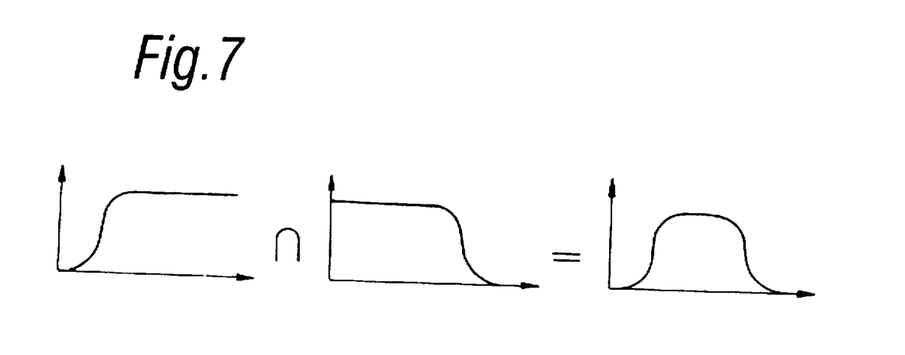
FIG. 7 is a view showing the structure method for the membership function (Middle)
Figure 8:
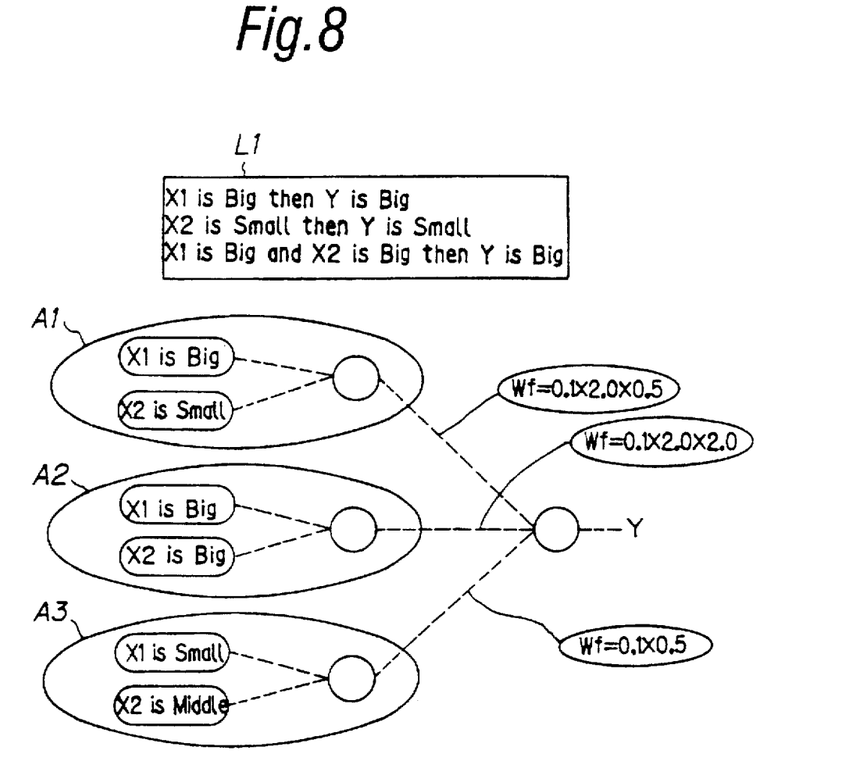
FIG. 8 is a view showing the method for determining the initial value for the weight of the interconnection from the AND rule to the output.

Next, description is made by presenting a specific example while referring to FIG. 7. First, the knowledge which has been obtained beforehand from an expert is structured for now as a rule L1. In this example, there are three rules which are "X1 is Big then Y is Big", "X2 is Small then Y is Small" and "X1 is Big and X2 is Big then Y is Big". Then, the interconnection of each unit of expert rule L1 and AND rules A1 to A3 of the rule layer 4 are compared, and the initial values of the weights are determined.

As for the initial values of the rules, initially, all of them are set to a certain value as a reference guide. Here for example, they are set to 0.1. Then the weight of the interconnections to the output from the AND rule of the section which fits the rule in which the output value of expert rule L1 is increased multiplying by the number of input items of the network. Conversely, the weight of the interconnections to the output from the AND rule of the section which fits the rule in which the output value of expert rule L1 is reduced is multiplied by the reciprocal of the number of the input items of the network.

For example, in AND rule A1, the fact that input value X1 is Big is in the rule that is obtained from the expert knowledge, and since the output at that time is Big, the initial value 0.1 of the initial weight is multiplied by 2, the number of input items. Furthermore, as for the fact that the input value X2 is Small, this is also in the rule that is obtained from expert knowledge, and since the output at that time is Small, the beginning value of the weight "0.1 X2" is multiplied by 0.5, the reciprocal of 2, the number of input items. By this means, the beginning value of the weight of AND rule A1 is determined. In the same manner, the weight of AND rule A2 is determined to be "0.1 X to X2.0", and the weight of AND rule A3 is determined to be "0.1×0.5". These are the beginning value of the weights before training. The weights of the interconnections other than those of the sections which were now mentioned are fixed at 1.

Next, the method of finding the output value of each layer is explained by using several equations. Since the output value of input layer 1 is the same as the input value, it is omitted. As for membership layers 2 and 3, as is shown in equation 1, the center value Wc1 to Wc8 (the input value when the output value of the membership function becomes 0.5) is applied to the membership function of the second layer.

$$H_{4(i-1)+j} = x_i + wc_{ij} \text{ (where, } wc_{ij} < 0) \quad (1)$$

Here, x is the output value of the input layer, wc is the center vague of the membership function, and H is the output value of the second layer. Also, i is the number of each of the input items, and j becomes 1 when it is Big, 2 or 3 when it is Middle, and 4 when it is Small. That which is expressed by this equation matches the position of the origin of the sigmoid function such as is shown in Equation 2, which is introduced later, to the position of the center value of the membership function.

Next, as is shown in Equation 3, by means of introducing a sigmoid function by multiplying the slope of the membership function at each region of that input value can be obtained. Now then, in the case of Middle, Equation 3a is used in place of Equation 3.

$$f(X) = \frac{1}{1+e^{-x}} \text{ (sigmoid function)} \quad (2)$$

$$M_{3(l-1)+\theta} = f(H_K \cdot w_{gK\theta}) \quad (3)$$

$$M_{3(l-1)+\theta} = \min\{f(H_K \cdot w_{gK\theta}), f(H_{K+1} \cdot w_{g(K+1)\theta})\} \quad (3a)$$

Here, wg is the value of the slope of the membership function, f(x) is the sigmoid function, M is the output value of the membership function, and min {f(x1), f(x2)} is a logical product of f(x1) and f (x2). Also, k is the number of the unit of the membership layer front half section 2. θ becomes 1 when it is Big, 2 when it is Middle, and 3 when it is Small. Also, in the Equation 3a, by means of computing the logical products, among the values of the two functions within the brackets for min, the smaller value is selected.

Continuing, as is shown in Equation 4, the calculations for the AND rule in rule layer 4 are conducted. As for these, as was previously mentioned, 2 items from among all of the entered items are selected, and among the 2 input items that have been selected, one par each is selected from the respective three regions (Big, Middle, Small), and the logical products of those 2 membership output values are calculated.

$$R_{3(l-1)+m} = \min \{M_l, M_m\} \text{ (where, } l<m) \quad (4)$$

Here, R is the output value of the AND rule, 1 and m are the numbers for the units of membership layer back half section 3. Also, by means of calculating the logical product here also, among the values of the two functions within brackets for min, the smaller of the values is selected.

Lastly, as is shown in Equation 5, the output value at output layer 5 is calculated. This is calculated by multiplying the output value for each AND rule that has been obtained by means of the fuzzy rule of the former condition section proposition (example: x1 is Big) by the value Wf of the weight of the interconnection from that rule and adding them, and taking the total to those divided by the total sum of all the outputs of the rules.

$$y = \frac{\sum_n (R_n \cdot w_{f_n})}{\sum_n R_n} \quad (5)$$

Here, n is the unit number of the rule layer.

Up to here is the process for calculations until the output value is obtained from substituting the input values in the network that has been structured. In the beginning, at the time this network was structured, the value of the weights in the initial period had weights which were determined for each layer, and even though input values were substituted, the output value was a random value, and the input/output relationship for the candidates could not be accurately simulated. Therefore, an adjustment of the weight was done in order to perform an accurate simulation. This is the learning of the network.

Next, it is explained in regard to how, by means of learning, correction is made and the input/output relationship for the candidates is accurately simulated. First, the output value of the sample data that is expressed by the input/output relationship of the candidates is made to be teacher data T. Then, as is shown in Equation 6, the square error between this learning data and output value y that has been obtained by means of Equations 1 to 5 from the input devices of the sample data (x1, x2, xn) is found.

$$E = \frac{1}{2}(T-y)^2 \quad (6)$$

$$E_q = \frac{1}{2}(T_q - y_q)^2 \quad (6a)$$

$$E = \sum_q E_q \quad (6b)$$

Here, E expresses the square error between the teacher data and the output value. It can be seen that the input/output relationship of the candidates can be accurately simulated by reducing this error difference. For purpose of simplification, Equation 6 shows an equation for a case in which there is one output value, but even in the case of a plurality of outputs (q outputs), the square error difference can be found by means of Equation 6a and Equation 6b, and learning can be conducted in the same manner as when there is one output.

As a method of reducing this error, a learning algorithm is used that is based on the back propagation method that is often used in the neural network. Below, it is explained in regard to the learning algorithms by using the equations. First, as is shown in Equation 7, Equation 6 is partially differentiated with respect to y. This is an effect of the output value on the error.

$$\frac{\partial E}{\partial y} = -(T-y) \quad (7)$$

Continuing, as is shown in Equation 8, Equation 6 is partially differentiated with respect to Wf. At this time, Equation 5 is substituted for Y of Equation 6.

$$\frac{\partial E}{\partial w_{f_p}} = \frac{\partial E}{\partial y} \frac{\partial y}{\partial w_{f_p}} = -(T-y)\frac{R_p}{\sum_n R_n} \quad (8)$$

Further, as is shown in Equation 9 and Equation 10, Equation 6 is partially differentiated with respect to Wg and WC. At this time, Equation 5, Equation 4, Equation 3 and Equation 3a, and Equation 1 are substituted in Equation 6.

$$\frac{\partial E}{\partial w_{g_{KI}}} = \frac{\partial E}{\partial y} \frac{\partial y}{\partial R_p} \frac{\partial R_p}{\partial M_l} \frac{\partial M_l}{\partial w_{g_{KI}}} = \quad (9)$$

$$-(T-y)\sum_r \left( \frac{w_{f_p} \sum_n R_n - \sum_n (R_n \cdot w_{f_n})}{\left(\sum_n R_n\right)^2} \right) M_l \cdot (1-M_l) \cdot H_K$$

$$\frac{\partial E}{\partial w_{c_{ij}}} = \frac{\partial E}{\partial y} \frac{\partial y}{\partial R_p} \frac{\partial R_p}{\partial M_l} \frac{\partial M_l}{\partial w_K} \frac{\partial H_K}{\partial w_{c_{ij}}} = \quad (10)$$

$$-(T-y)\sum_r \left( \frac{w_{f_p} \sum_n R_n - \sum_n (R_n \cdot w_{f_n})}{\left(\sum_n R_n\right)^2} \right) M_l \cdot (1-M_l) \cdot w_{g_{KI}}$$

This Equation 8 to Equation 10 are an influence on the respective weights for the errors. Here, the r in Equation 9 and Equation 10 is only a number that has been selected as an output of the AND rule from the weight which realizes the membership function which should be corrected, and takes the total of the errors from the units of the rule layer.

By means of correcting the weights in a direction in which these influences are reduced, the error is reduced overall. The correction amounts respectively become as follows.

$$\Delta w_{f_p} = -\alpha \frac{\partial E}{\partial w_{f_p}} \quad (11)$$

$$\Delta w_{g_{K\theta}} = -\alpha \frac{\partial E}{\partial w_{g_{K\theta}}} \quad (12)$$

$$\Delta w_{c_{ij}} = -\alpha \frac{\partial E}{\partial w_{c_{ij}}} \quad (13)$$

Here, a is what is referred to as the learning parameter, and is the parameter which determines how much to make the correction amount of the weight for which the effect is reduced. By using this, corrections are conducted such as are shown in Equation 14 to Equation 16.

$$w_{f_p} = w_{f_p} + \Delta w_{f_p} \quad (14)$$

$$w_{g_{k\theta}} = w_{g_{k\theta}} + \Delta w_{g_{k\theta}} \quad (15)$$

$$w_{c_{ij}} = w_{c_{ij}} + \Delta w_{c_{ij}} \quad (16)$$

Repeated learning is conducted according to the above types of algorithms, and by means of continuing to correct the weight, the error can be reduced by a certain degree. Then, the teaching is ended at the point in time in which the error value becomes below a permissible error value. This permissible error value is a value which has been determined beforehand, and because it can be assumed that the permissible error value varies, depending on the candidate, it is necessary to determine the permissible error value for that candidate.

Next, it is explained in regard to what the respective weights which have been adjusted by means of this type of learning are expressing. First, as for wf, by looking at the previous Equation 8 it can be seen that, as for the correction of wf, only the value of Rp is different, and as for the later values, the same value is used no matter which wf is corrected. In other words, it comes to be that the correction of wf is influenced only by the value of Rp. This value of Rp expresses the suitability of each rule, and if the larger this value is, it comes to be that the better the input parameter fits in that rule.

Figure 9:
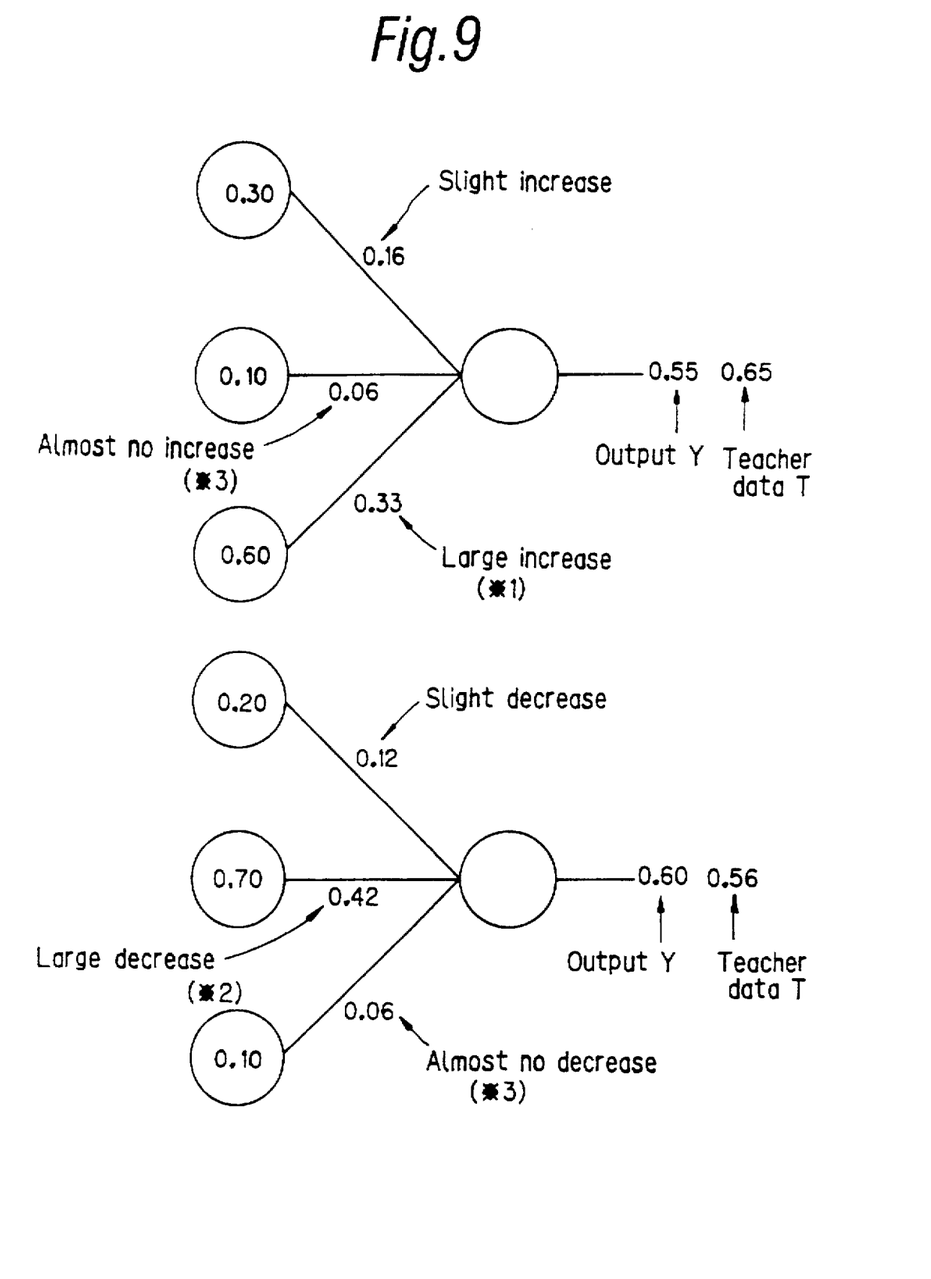
FIG. 9 is a view showing a correction method for the weight between the rule layer and the output layer.

As shown in FIG. 9, when the teacher data T at this time is a large value, since it makes a large correction in the direction which decreases the error between teacher data T and output value y weight wf is corrected in a direction such that output value y becomes a large value (*1 in the figure). In the same manner, when teacher data T is a small value, since a large correction is made in the direction to decrease the error between teacher data T and output value y, weight wf is corrected in a direction such that the output value becomes a small value (*2 in the figure). Conversely, when the value of Rp is small, this shows that the input parameter does not match that rule, and since they are each corrected slightly, the weight wf which does not match that rule becomes such that it is not corrected that much (*3 in the figure).

By this means, the larger the output becomes the larger the weight of the rule becomes, and conversely, the smaller the output becomes the smaller the weight of the rule becomes. Also, if the weight becomes 0, that rule becomes a rule which has no relationship to the output. In other words, by means of looking at the weight wf of this rule, a determination can be made as to whether it is a rule in which the output becomes large, a rule in which the output becomes small, or a rule which has no relationship to the output, and so on.

Next, as for Wg, in the previous Equation 9, the section shown in Equation 17 is an equation which calculates the total propagation of errors from the AND rule which contains the output value of that membership.

$$\sum_r \left( \frac{w_{f_p} \sum_n R_n - \sum_n (R_n \cdot w_{f_n})}{\left( \sum_n R_n \right)^2} \right) \quad (17)$$

Figure 10:
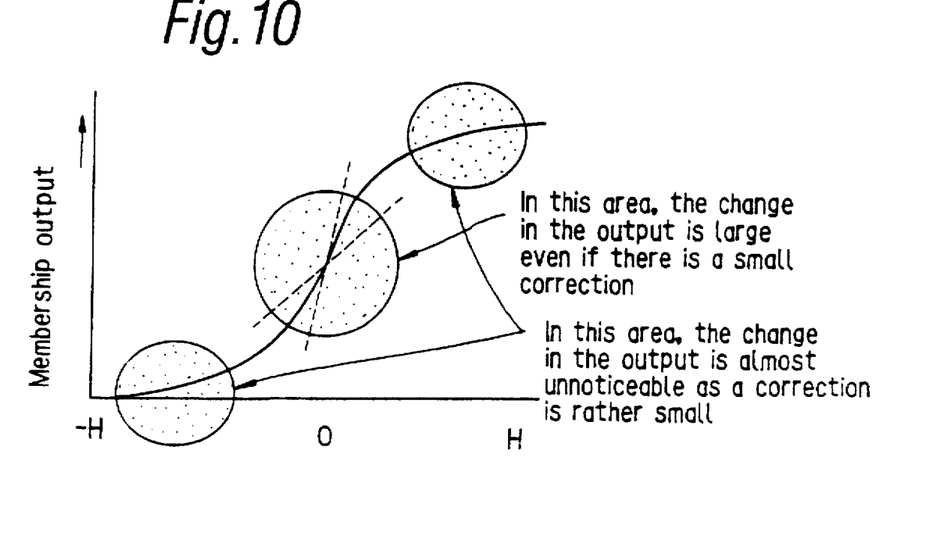
FIG. 10 is a view showing the difference between the corrected amount and the output value of the weight which expresses the slope of the membership function.

In this equation the only value which is different in each rule is Wfp. In other words, the greater the number of rules with a large weight, the greater the correction slope of the membership function becomes. Also, it can be seen from Equation 9 that the greater the absolute value of value H which corresponds to the x axis of the sigmoid function, the greater the correction of the slope of the membership function becomes. The greater the number of rules in which the weight is large, the more it must be made so as to match the output by correcting the slope, and also, as the absolute value of H becomes greater, the correction becomes no meaning unless the slope is significantly corrected. Hence, it can be said that the correction based on this Equation 9 is valid. This relationship is shown in FIG. 10.

Figure 11:
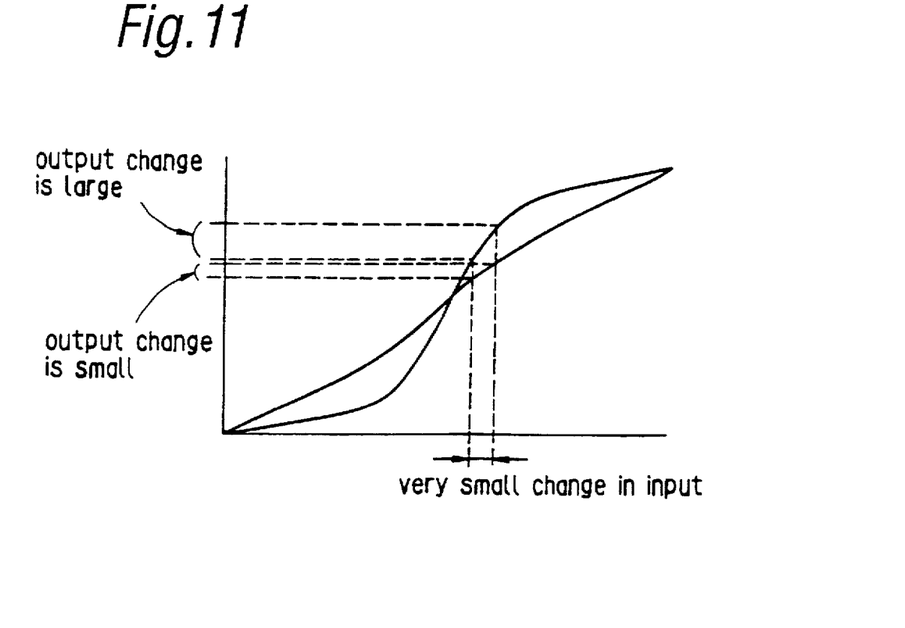
FIG. 11 is a view showing the difference between the corrected amount and the output value of the weight which expresses the slope of the membership function.

According to this, as for the fact that the slope becomes steep, this comes to show that the output value changes greatly for a slight change of the input value which relates to the rule in which the output becomes large. This relationship is shown in FIG. 11. In other words, by means of looking at the weight Wg which shows the slope of this membership function, it can be seen which input value the output value reacts sensitively to, in other words, which input has a high contribution rate in regard to the output.

Figure 12:
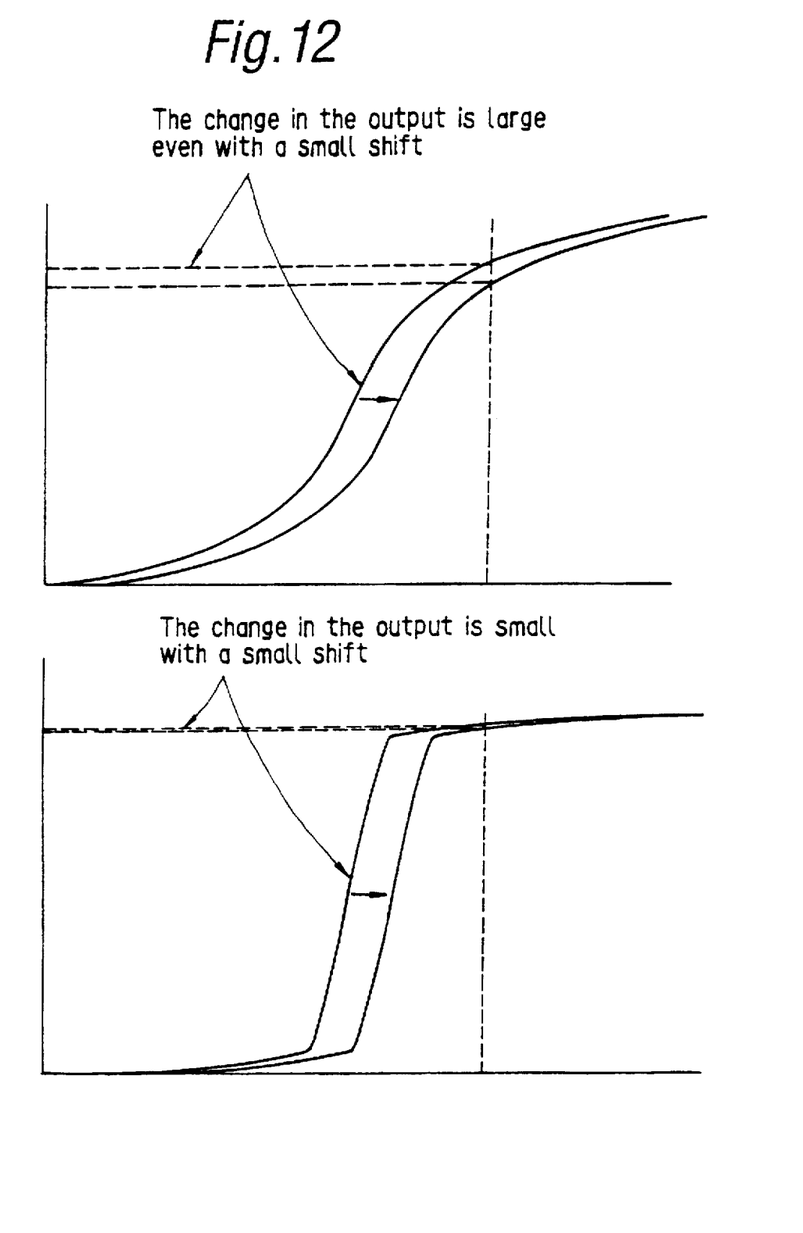
FIG. 12 is a view showing the difference between the corrected amount and the output value of the weight which expresses the center value of the membership function.

Lastly, as for Wc, the differences between the right side of the previous Equation 10 and the right side of Equation 9 are H and Wg only. Wg of the right side of Equation 10 is the slope of that membership function, and the steeper that slope is, the larger the correction of the center value of that membership function. The steeper the slope of membership function a significant change in the output value cannot be seen unless the center value is moved in a great extent, even if there is a correction. This relationship is shown in FIG. 12. As for the fact that a change in the output cannot be seen, it comes to be that the error does not change from before correction, and the correction becomes meaningless. It can be said from this fact also that the correction based on Equation 10 is valid.

In the same manner as with Wg, it can be seen which input value the weight Wc, which shows the center value of this membership function, reacts sensitively to at an established rate, in other words, which input value has a large contribution rate in relation to the established rate, and by looking at weight Wc, it can be seen about what the range is of Big, Middle, and Small in the respective input items.

Next, the effect of the present invention is explained in detail.

In the past, in the fuzzy neural networks which were structured only with the knowledge from experts, in the event the knowledge which was obtained from the intuition and experience of the experts was too vague, or in the event it was mistaken, the network became a structure that was different from the structure that was actually desired, and there were the unfavorable circumstances that not only did the learning of the neural network take a lot of time, but it became unable to learn well.

However, according to the present invention, along with the input/output relationship of the candidates from intuition and experience of experts being structured as a fuzzy rule with a former condition section proposition and a later condition section proposition having a fuzzy set, it constructs a neural network that is separate from that from just that the number of input/output items. By means of structuring the weight of the interconnections so as to be based on the above-mentioned fuzzy model, in the event the knowledge that is obtained from the intuition and experience of the experts is too vague, or even in the case that it is mistaken, because the network is structured so that it always fits somewhere in the fuzzy rule, the effect is that it can avoid it becoming a structure in which the network is mistaken and in which the learning of the neural network cannot be done well.

At the time of structuring the neural network from the input/output relationships, by means of structuring it so that all of the input values are divided into the three regions of Big, Middle, and Small, the values of each input item necessarily come to be classified in at least one of the regions among the three regions, and has the effect that even when sample data is entered from expert knowledge that is not in the fuzzy rule, it can respond on the neural network.

In the past, because the fuzzy rule had one or a number of inputs mixed, in particular when it was an AND rule with a number of input items, the calculations became troublesome, and it was further inconvenient since it became complicated as a network was structured. However, at the time of structuring a neural network from the input/output relationships, by means of selecting 2 among all of the input items, selecting 1 each of the three regions into which each of the 2 input values has been divided, and structuring these so as to make an AND rule for the 2 input items, because it becomes just a simple relationship between the two input items, it has the effects that, not only does the structure of the network become simple, but because the calculation of the AND rules is always for only 2 inputs, it improves just by all of the calculations being the same, and it becomes simplified.

In the past, because it was only a fuzzy rule which obtained knowledge from experts, there was the inconvenience that it could not respond to relationships that were not in that rule. However, at the time of structuring a neural network from the input/output relationships, by means of structuring the AND rules so as to find 2 combinations among all of the regions for all of the other input items, in contrast to the three regions for each input item, because the relationships for all of the two input items could be covered, it has the effect that more accurate corrections can be done in learning even when too vague a rule or a mistaken rule is applied.

In the past, in the learning process for the fuzzy neural network, as for the weight of the connected section of the network which must learn, since small adjustments have been made by means of the back propagation method or such for all of them, the amount of calculations became very large, and there was the inconvenience that the learning also took a fairly long time. However, in the learning process for the fuzzy neural network, the correction of the weight of the network which actually realizes the membership function is a correction of only the weight of the membership output value that is selected by the AND rule. Particularly in the case of Middle, among the 2 sigmoid functions in which the slopes are mutually opposite, by means of correcting only the weight for the sigmoid function which contributes to the membership output value of Middle, only the related item is corrected; therefore, it has the effect that the learning speed can be made fast.

In the past, because it was only a fuzzy rule which obtained knowledge from experts, the mutual relationship between certain regions of 2 input item which were not in that rule (an input/output relationship in a region in which x1 is Small and x2 is Big), there was the inconvenience that it could not respond. However, in the learning process for the fuzzy neural network, due to learning in each of all of the nine regions into which they have been divided by the AND rule for 2 input items, there is the effect that this relationship can be expressed even when the relationship between 2 input items is not a relationship of a monotonic increase or a monotonic decrease, but is a more complicated relationship.

In the past, the weight that was corrected by means of the learning was only as far as to accurately simulate the input/output relationship, and an interpretation of the meaning of the weight was not performed yet. However, in the fuzzy neural network after the completion of the learning by means of correcting weight Wf by conducting the teaching of the network using the equation shown in Equation 14, because the weight of the feedback interconnections between the rule layer and the output layer are made so as to show the significance of the respective rules, in the event the knowledge that has been obtained from intuition and experience of experts is too vague, or in the event it is mistaken, it has the effect that the vague knowledge is obtained as clarified knowledge, and as for the mistaken knowledge, it can determine what really is truly correct knowledge.

In the past, conducting the teaching of the network using the equation shown in Equation 15, correction of weight Wg was conducted. Nevertheless, an interpretation of the meaning of the weight was not performed yet. However, in the fuzzy neural network after the completion of learning, because the weight expresses the slope of the membership function was made so as to show the contribution rate of the input items in relation to the output items, effective input items in relation to the output value can be obtained, and it has the effect that it can be seen which input item to take the value of in order to obtain the best results. Conducting the learning for the network used in the equation shown in Equation 16, because the center value of the membership function becomes such as to express the correct region division of the respective input items by means of correcting the weight Wc, it becomes clear as to which range to indicate of the Big, Middle, and Small based on expert experience in each input item.

What is claimed is:

1. A fuzzy neural network system comprising:

an input layer having a number of input units, the number of input units being dependent upon a number of input values;

a membership layer front half section having a plurality of membership layer front half section units, each of the membership layer front half section units being connected to at least one of the input units by an input/membership layer interconnection, at least some of the input/membership layer interconnections being weighted by a center value of a membership function;

a membership layer back half section having a plurality of membership layer back half section units, each of the membership layer back half section units being connected to at least one of the membership layer front half section units by a membership layer front half/back half interconnection, at least some of the membership layer front half/back half interconnections being weighted by a slope of the membership function;

a rule layer having rule layer units which form logical combinations of outputs from the membership layer back half section units using AND rules; and an output layer having a number of output units in accordance with a predetermined number of network output values, each of the rule layer units being connected to at least one of the output units by a rule/output interconnection, each rule/output interconnection being weighted by a corresponding rule/output weight.

2. A fuzzy neural network system as claimed in claim 1, wherein said input layer and said membership layers are structured so as to divide the each input value into three regions of fuzzy sets, respectively, said rule layer selecting one each respectively from said items divided into three regions to make these the AND rules for two input items.

3. A fuzzy neural network system as claimed in claim 1, wherein a rule/output weight for a given rule/output interconnection is initially set in accordance with a reference guide; wherein a comparison is made with the reference guide and a known expert rule; and wherein, as a result of the comparison, one of the following occurs:

(1) the reference guide for the given rule/output interconnection is multiplied by a predetermined value if a rule for the rule unit involved in the given rule/output interconnection results in an increased output from the output layer;

(2) the reference guide for the given rule/output interconnection is multiplied by a reciprocal of the predetermined value if a rule for the rule unit involved in the given rule/output interconnection results in a decreased output from the output layer.

4. A learning method for a fuzzy neural network system, the method comprising:

inputting a number of input values to a number of input units in an input layer;

forming a membership layer having a membership layer front half section and a membership layer back half section, the membership front half section having a plurality of membership layer front half section units, each of the membership layer front half section units being connected to at least one of the input units by an input/membership layer interconnection, the membership layer back half section having a plurality of membership layer back half section units, each of the membership layer back half section units being connected to at least one of the membership layer front half section units by a membership layer front half/back half interconnection;

using a center value of a membership function to weight at least some of the input/membership layer interconnections;

using a slope of the membership function to weight at least some of the membership layer front half/back half interconnections;

forming logical combinations of outputs from the membership layer back half section units using AND rules in rule layer units in a rule layer;

connecting each of the rule layer units to at least one of a number of outputs units in an output layer by a rule/output interconnection; and weighting each rule/output interconnection by a corresponding rule/output weight by:

initially setting the rule/output weight for a given rule/output interconnection in accordance with a reference guide;

comparing the reference guide and a known expert rule; and, as a result of the comparison:

(1) multiplying the reference guide for the given rule/output by a predetermined value if a rule for the rule unit involved in the given rule/output interconnection results in an increased output from the output layer;

(2) multiplying the reference guide for the given rule/output interconnection by a reciprocal of the predetermined value if a rule for the rule unit involved in the given rule/output interconnection results in a decreased output from the output layer.

* * * * *